UNITED STATES PATENT OFFICE.

FRANCIS EDWARD MATTHEWS AND HENRY JAMES WHEELER BLISS, OF LONDON, ENGLAND.

MANUFACTURE OF UNSATURATED HYDROCARBONS AND INTERMEDIATE COMPOUNDS.

1,144,558. Specification of Letters Patent. Patented June 29, 1915.

No Drawing. Application filed June 7, 1913. Serial No. 772,390.

*To all whom it may concern:*

Be it known that we, FRANCIS EDWARD MATTHEWS, of 7 Staple Inn, in the county of London, England, and HENRY JAMES WHEELER BLISS, of Ingram House, Stockwell, London, England, both subjects of the King of Great Britain and Ireland, have invented a new and useful Manufacture of Unsaturated Hydrocarbons and Intermediate Compounds, of which the following is a specification.

In the manufacture of doubly unsaturated hydrocarbons by the abstraction of two molecular proportions of halogen acid from the dihalids of the saturated hydrocarbons, the halogen atoms are, in some cases, in such a position in the molecule that the tendency is to form allene, or acetylene, derivatives, rather than the conjugated double linkage. The conversion of the allene linkage into conjugated linkage, for instance by heat, has been suggested, but such methods necessitated the preparation of allenes which were subsequently converted into conjugated bodies, such conversion necessarily involving some expense and loss.

We have found that, as a step in the manufacture of doubly unsaturated hydrocarbons the dihalids may be so treated as to cause an intramolecular re-arrangement, or isomerization, and thus make them more suitable for the preparation of the bodies containing conjugated double bonds.

We are aware that Favorsky has shown that if the dibrom derivatives of certain hydrocarbons be heated in a sealed tube, a mixture of dibromids usually results and this intramolecular change has been explained by assuming that hydrobromic acid is split off and again added onto the molecule in another position. Since, however, a mixture of dibromids is usually obtained, Favorsky's method is unsuitable for the preparation of a definite dibromid. We have now discovered the hitherto unsuspected fact that dichlorids may also be made to undergo a somewhat similar change, and since hydrochloric acid is usually added to a double bond with difficulty, it is probable that the intramolecular re-arrangement does not involve the intermediate formation of hydrochloric acid and unsaturated chlorid. This is also confirmed by the fact that a sufficiently high temperature will eliminate hydrochloric acid from the molecule, the hydrochloric acid not being again added thereto.

According to our invention in order to convert a dihalid into another dihalid, we heat it to a temperature below that which will cause any appreciable decomposition into halogen acid and unsaturated bodies. This may be advantageously carried out by passing the vapors of the dihalids through a tube heated to the desired temperature. If the dihalid to be obtained has a higher boiling point than the initial dihalid, we may use an apparatus such as is described in the specification of the application for British Letters Patent No. 22,737 A. D. 1912, by which the lower boiling portion of the liquid is continuously acted upon and the higher boiling portion is retained in the boiler. If the desired dihalid has a lower boiling point than the initial dihalid, the vapor after passsing through the hot tube may be passed through a condenser maintained at such a temperature as to condense the higher boiling portions which are again treated, the lower boiling portions being allowed to pass off and be condensed elsewhere. In this manner a continuous circulation of the dihalid to be treated may be carried on and the effects of a balanced reaction, as described by Favorsky, are avoided and the conversion may be nearly complete. In some cases, however, the mutual conversion of the dihalids into one another may be much more rapid in one direction than in the other, so that the conversion is easily effected in one direction, but only with difficulty in another. The new dihalid may then be used for the preparation of doubly unsaturated hydrocarbons by the removal of halogen acid.

The process according to this invention is especially applicable for treating the 1.2-dihalids in which the carbon atom in the position 1 is a primary carbon atom, which, unless there be some molecular re-arrangement, can only yield allenes, or acetylenes.

The following example further shows how our invention may be carried out into practical effect, but the invention is not limited to the said example.

Example: 237 grams of 1.2-di-chlor-3-methyl-butane (boiling point about 144° centigrade) are placed in a flask and boiled; the vapors, after being passed through a silica tube maintained at a temperature of from 324° to 336° centigrade, are condensed and run back into the flask. The operation is continued for 4 hours, or thereabout. At a temperature not exceeding 330° to 335° centigrade, there is practically no liberation of hydrochloric acid.

On fractioning the product, the following fractions are obtained:—A, 22 grams pass over below 130° centigrade; B, 27 grams pass over between 130° and 135° centigrade; C, 87 grams pass over between 135° and 140° centigrade; D, 86 grams pass over between 140° and 145° centigrade; E, 8 grams pass over between 145° and 150° centigrade—leaving 5 grams residue, showing a loss of 2 grams. The fractions B and C are principally 2.3-di-chlor-3-methyl-butane (boiling point about 137° centigrade).

The 2.3-dichlorid may be used for the production of isoprene by the removal of hydrochloric acid.

The temperatures given in the example may be varied within reasonable limits as the isomerization probably commences at a lower temperature than that given.

Having now particularly described and ascertained the nature of our said invention and in what manner the same is to be performed, we declare that what we claim is:—

1. In the manufacture of doubly unsaturated hydrocarbons, containing conjugated double bonds, from dihalogen substitution derivatives of hydrocarbons having the halogen on the ultimate and penultimate carbon atoms of an open chain, converting the said dihalids into more suitable dihalids by heating them to a temperature substantially above their boiling point (at ordinary pressure) but below that at which halogen acid is formed by decomposition.

2. In the manufacture of doubly unsaturated hydrocarbons, containing conjugated double bonds for dichlor substitution derivatives of hydrocarbons having the chlorin on the ultimate and penultimate carbon atoms of an open chain, converting the said dichlorids into more suitable dichlorids by heating them to a temperature substantially above their boiling point (at ordinary pressure) but below that at which hydrochloric acid is formed by decomposition.

3. The manufacture of doubly unsaturated hydrocarbons containing conjugated double bonds from dihalogen substitution derivatives of hydrocarbons having the halogen on the ultimate and penultimate carbon atoms of an open chain, by converting the said dihalids into more suitable dihalids by heating vapors thereof to a temperature substantially above their boiling point (at ordinary pressure) but below that at which halogen acid is formed by decomposition and condensing the vapors of such portion of the product as has a boiling point different from that desired and subjecting it to further treatment for completing the isomerization.

4. The manufacture of doubly unsaturated hydrocarbons containing conjugated double bonds from dichlor substitution derivatives of hydrocarbons having the chlorin on the ultimate and penultimate carbon atoms of an open chain, by converting the said dichlorids into more suitable dichlorids by heating vapors thereof to a temperature substantially above their boiling point (at ordinary pressure) but below that at which hydrochloric acid is formed by decomposition and condensing the vapors of such portion of the product as has a boiling point different from that desired and subjecting it to further treatment for completing the isomerization.

5. Process for converting 1.2-di-chlor-3-methyl-butane into 2.3-dichlor-3-methyl-butane, consisting in heating vapors of 1.2-di-chlor-3-methyl-butane at a temperature of from 324° to 336° centigrade.

In testimony whereof we have signed our names to this specification in the presence of two subscribing witnesses.

FRANCIS EDWARD MATTHEWS.
HENRY JAMES WHEELER BLISS.

Witnesses:
CHOREVANT HOLMES,
JOHN ROWLAND WHINCOP.